(12) United States Patent
Miller

(10) Patent No.: US 7,904,217 B2
(45) Date of Patent: Mar. 8, 2011

(54) BATTERY PACK MANAGEMENT STRATEGY IN A HYBRID ELECTRIC MOTOR VEHICLE

(75) Inventor: Stanton E. Miller, Fort Wayne, IN (US)

(73) Assignee: International Truck Intellectual Property Company, LLC, Warrenville, IL (US)

(*) Notice: Subject to any disclaimer, the term of this patent is extended or adjusted under 35 U.S.C. 154(b) by 519 days.

(21) Appl. No.: 12/054,542

(22) Filed: Mar. 25, 2008

(65) Prior Publication Data
US 2009/0248228 A1 Oct. 1, 2009

(51) Int. Cl.
G05D 3/00 (2006.01)
(52) U.S. Cl. ......... 701/22; 701/70; 180/65.28; 180/65.1; 903/951
(58) Field of Classification Search .................... 701/22, 701/70; 180/65.28, 65.1, 65.21, 65.265; 903/951; 192/84.2
See application file for complete search history.

(56) References Cited

U.S. PATENT DOCUMENTS

| 5,441,122 A | 8/1995 | Yoshida |
| 5,778,326 A | 7/1998 | Moroto et al. |
| 5,832,396 A | 11/1998 | Moroto et al. |
| 6,480,767 B2 | 11/2002 | Yamaguchi et al. |
| 7,013,205 B1 | 3/2006 | Hafner et al. |
| 7,017,327 B2 | 3/2006 | Hunt et al. |

FOREIGN PATENT DOCUMENTS

JP A-2007062638 * 4/2005

OTHER PUBLICATIONS

"Chevrolet Silverado," www.//en.wikipedia.org/wiki/Chevrolet_Silverado, Wikimedia Foundation, Inc., Mar. 4, 2008.
PCT Search Report for corresponding PCT application, Serial No. PCT/US2009/038179, and cited foreign patents.

* cited by examiner

Primary Examiner — Gertrude Arthur Jeanglaud
(74) Attorney, Agent, or Firm — Jeffrey P. Calfa; Mark C. Bach

(57) ABSTRACT

A software algorithm (FIG. 3) determines the strategy by which a controller (34) will manage state of charge (SOC) of a battery pack (32) in a hybrid electric vehicle but always gives the driver the opportunity to make his/her own selection instead. The algorithm causes one of two strategies to be selected each time that the ignition switch is operated from "off" position to "on" position. The manner in which the algorithm executes depends on the value of a calibratable parameter electronically programmed into the controller of the particular vehicle when the vehicle is being built at the factory.

11 Claims, 4 Drawing Sheets

BATTERY PACK MANAGEMENT STRATEGY IN A HYBRID ELECTRIC MOTOR VEHICLE

FIELD OF THE INVENTION

This invention relates to hybrid electric motor vehicles and in particular to a strategy for managing the state of charge (SOC) of a high-voltage battery pack in such a vehicle.

BACKGROUND OF THE INVENTION

A hybrid electric vehicle can operate with significantly greater fuel economy in comparison to a corresponding vehicle that is propelled only by an internal combustion engine. Fuel economy improvements of 30% or greater are not uncommon. The cost of hydrocarbon fuels like diesel fuel have prompted some commercial truck users to explore the potential benefit that a hybrid electric vehicle might offer for their particular businesses.

For example, a business, such as an electric utility, that needs to operate electric devices like power tools at remote job sites might consider purchasing a hybrid electric vehicle that can deliver exportable AC power. A different business, such as a frozen or refrigerated food delivery company, may consider purchasing a hybrid electric vehicle having a body with a refrigeration system, with the refrigeration system operated by a compressor using on-board AC power while the vehicle is being driven. Such a vehicle can operate over an extended delivery area in comparison to a refrigerated truck that employs a cold plate technology where the refrigeration system resides in the truck body but operates only when the vehicle is parked and the refrigeration system is plugged into an electric outlet, typically at night. Delivery route time for the latter truck is limited by the length of time for which the cold plate is able to maintain the frozen or refrigerated goods at the proper temperature.

A plug-in hybrid electric vehicle (PHEV) provides a capability that allows the owner/operator to plug the vehicle's electrical system into the electric utility grid to charge the high-voltage hybrid battery pack. This is normally done during nighttime, when there is typically an excess of AC electricity available on the grid and the price per kilowatt-hour is typically at its lowest. In order to make a PHEV most effective, it should have greater battery energy storage capacity than its non-plug-in hybrid counterpart.

SUMMARY OF THE INVENTION

Insofar as the inventor is aware, current hybrid electric vehicles are built to have only one battery management strategy. Such a single strategy doesn't allow the operator (driver) to select a different strategy that would be more suited to the intended use of the vehicle on a particular day.

The inventor believes that the owner/operator of a PHEV that is driven in different ways at different times over different drive cycles should be able to choose how and when to consume the electric energy that re-charged the PHEV battery pack while the vehicle was parked. If the vehicle is being operated with a "Maintain Charge To Job Site" strategy, that is a feature of the invention to be described, the high-voltage control module will allow some limited use of the motor/generator for propulsion and regeneration while driving, while striving to maintain battery SOC somewhere between 75-95%, depending on the specific battery capacity and battery chemistry. Maintaining this relatively high level SOC allows for the recapture of kinetic energy when the vehicle is braking, while saving most of the battery energy for job site or on-board equipment operation. If, on the other hand the vehicle is being operated with a "Maximize Fuel Economy" battery pack management strategy, that is also a feature of the invention to be described, the high-voltage control module will allow the motor/generator to provide a greater proportion of vehicle propulsion energy and battery pack SOC will be maintained at a lower level—probably 25-65%, again depending upon specific battery capacity and battery chemistry.

The present invention utilizes a software algorithm for determining the particular strategy by which the controller will manage battery pack SOC but always gives the driver the opportunity to make his/her own selection instead. The algorithm causes one of two strategies, either the "Maximize Fuel Economy" or the "Maintain Charge To Job Site", to be automatically selected each time that the vehicle's ignition switch is operated from "off" position to "on" position.

However, the manner in which the algorithm executes depends on the value of a calibratable parameter electronically programmed in the control module of the particular vehicle when the vehicle is being built at the factory. The calibratable parameter determines a specific branch of the algorithm that will be executed each time the ignition switch is turned from "off" to "on".

When the ignition switch is operated from "off" to "on" in preparation for a drive cycle, the driver is given the opportunity to make a selection of "Maximize Fuel Economy" or "Maintain Charge To Job Site" (other similar terms may be used instead) on the display portion of an instrument panel module that has a momentary contact switch along side the display. The driver then has the ability to change the automatic selection (i.e., the default selection) by pressing the momentary contact switch along side the display, if he/she chooses to do so. Hence, when the vehicle's ignition switch is operated from "off" to "on", the present invention gives the owner/operator of a PHEV the ability to select how the stored battery pack energy will be used, if he/she wishes to do so, regardless of what strategy the controller has been programmed to select.

Giving the driver an opportunity to effectively override what amounts to a default battery management strategy selection by an algorithm affords a choice of either using a significant portion of the stored energy for vehicle propulsion purposes or conserving a significant portion of the stored energy for job site or on-board equipment (such as a refrigeration compressor) operation. For instance when the "Maintain Charge To Job Site" strategy is the default mode of operation after the ignition switch has been operated from "off" to "on", the operator can select "Maximize Fuel Economy" before returning to home base so that the vehicle operates with better fuel economy. Providing flexibility in selecting a battery pack SOC management strategy enables the vehicle owner/operator to use stored battery energy in a way that he/she deems best.

One value for the calibratable parameter will cause the algorithm to execute in a manner that sets the battery management strategy to the strategy that was in effect when the vehicle was last shut down. The driver can however still make his/her own selection.

Another value for the calibratable parameter will cause the algorithm to execute in a manner that sets the battery management strategy to "Maintain Charge To Job Site" after the battery pack has received a maximum plug-in charge (SOC-Plug-in>KWHMin, a predetermined value in the algorithm), or if the "Maintain Charge To Job Site" strategy had been in effect prior to last turning the ignition switch from "on" to "off". Again the driver can still make his/her own selection.

For instance, if the vehicle frequently travels to job sites where power tools are used and the normal mode of operation is to re-charge the battery pack overnight, the operator might not normally override the strategy set by the algorithm in order to maintain high SOC upon arrival at the job site. On the other hand, if the operator is not going to a job site where exportable electric power will be required on a given day, fuel efficiency may be optimized by manually selecting "Maximize Fuel Economy".

Specifics for the battery charging algorithm depend on the specific battery chemistry (NiMH, Li-ion, etc) and battery capacity (KW-Hr) in any given vehicle.

One generic aspect of the present invention relates to a hybrid electric vehicle comprising a chassis comprising wheels on which the vehicle travels and a powertrain coupled to driven ones of the wheels. The powertrain comprises an internal combustion engine having a rotary output coupled to a rotary input of an electric motor/generator that has a rotary output coupled to the driven wheels. The vehicle also has an ignition switch that when operated to an "on" position enables the powertrain to propel the vehicle and when operated to an "off" position shuts down the powertrain.

A battery pack is coupled to the motor/generator through a controller for selectively operating the motor/generator as a motor that draws electricity from the battery pack to add torque to the powertrain and as a generator that delivers electricity to the battery pack to subtract torque from the powertrain when a management strategy for the battery pack allows such operation.

The controller is selectively operable to any of multiple strategies for managing the battery pack via an algorithm that, when the ignition switch is operated from "off" to "on", operates to select a particular battery pack management strategy according to a calibratable parameter that, for the vehicle, has been set to a particular one of multiple values.

A first of the calibratable parameter values is effective to cause the algorithm to set the battery pack management strategy to the same battery pack management strategy that was in effect when the ignition switch was last operated from "on" to "off". A second of the calibratable parameter values is effective to cause the algorithm to set the battery pack management strategy to a strategy that is determined by the number of times that the ignition switch has been operated from "off" to "on" since the last re-charging of the battery pack from a source external to the vehicle.

A further generic aspect of the invention relates to a method of operating a vehicle as described above. When the ignition switch is operated from "off" position to "on" position, an algorithm selects a strategy for managing the battery pack according to a calibratable parameter that, for the vehicle, has been set to a particular one of multiple values, a first of the calibratable parameter values being effective to cause the algorithm to set the battery pack management strategy to the same battery pack management strategy that was in effect when the ignition switch was last operated from "on" position to "off" position, and a second of the calibratable parameter values being effective to cause the algorithm to set the battery pack management strategy to a strategy that is determined by the number of times that the ignition switch has been operated from "off" position to "on" position since the last re-charging of the battery pack from a source external to the vehicle.

Still another generic aspect relates to a hybrid electric vehicle comprising a chassis comprising wheels on which the vehicle travels, a powertrain coupled to driven ones of the wheels, and an ignition switch that when operated to an "on" position enables the powertrain to propel the vehicle and when operated to an "off" position shuts down the powertrain. The powertrain comprises an internal combustion engine having a rotary output coupled to a rotary input of an electric motor/generator that has a rotary output coupled to the driven wheels.

A battery pack is coupled to the motor/generator through a controller for selectively operating the motor/generator as a motor that draws electricity from the battery pack to add torque to the powertrain and as a generator that delivers electricity to the battery pack to subtract torque from the powertrain when a management strategy for the battery pack allows such operation.

The controller is selectively operable to any of multiple battery pack management strategies via an algorithm that, when the ignition switch is operated from "off" position to "on" position, operates to cause the battery pack management strategy to default to one of the battery pack management strategies.

A selection input to the controller allows a person, instead of the algorithm, to select a battery pack management strategy for use by the controller different from the default strategy determined by the algorithm when the ignition switch was operated from "off" position to "on" position.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
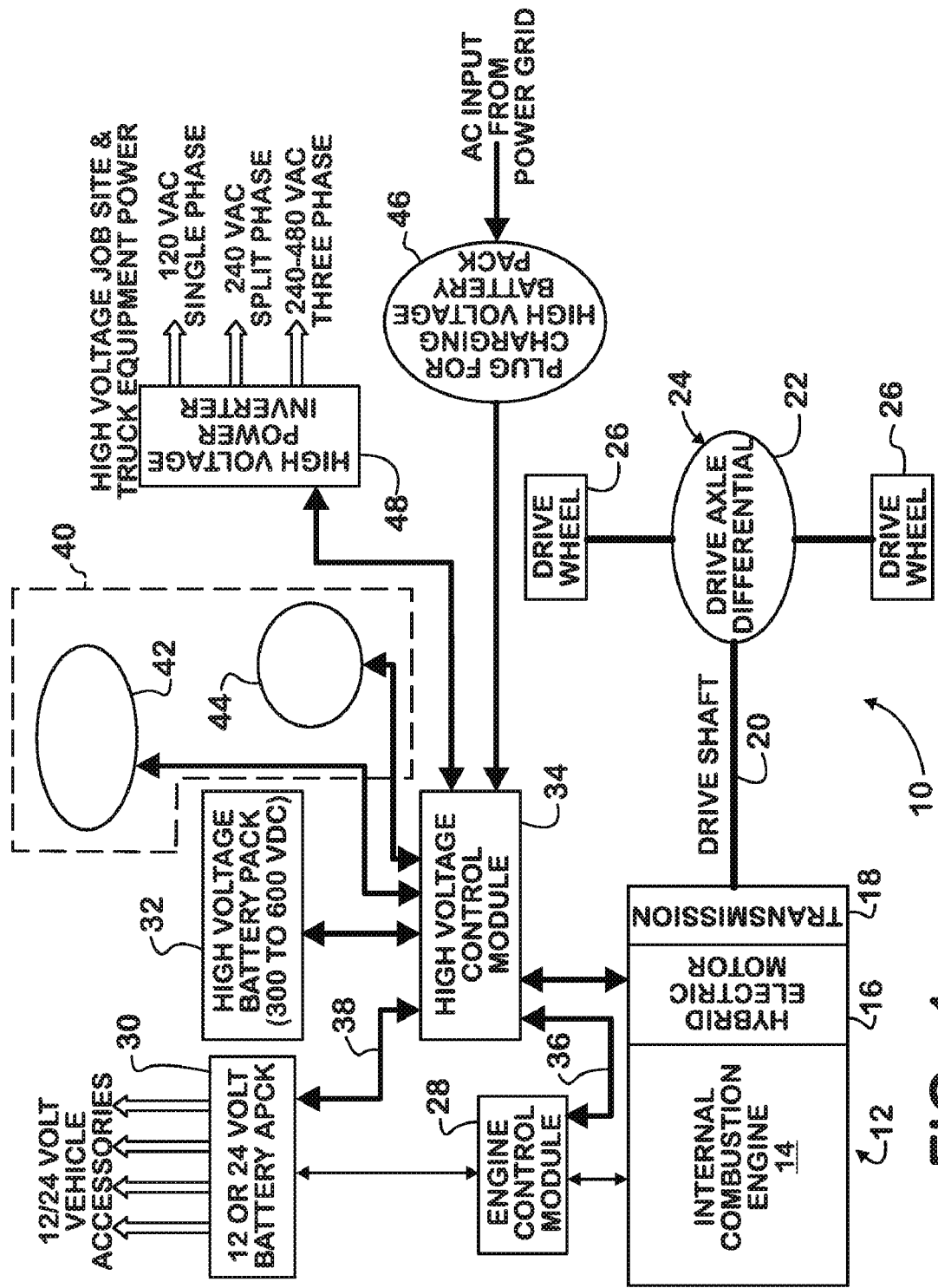
FIG. 1 is a general schematic diagram of portions of a hybrid electric vehicle relevant to an understanding of principles of the present invention.

FIG. 1 shows a portion of a hybrid electric vehicle 10 relevant to an understanding of principles of the present invention. The specific vehicle is a PHEV.

PHEV 10 is shown, by way of example, as a rear wheel drive type vehicle that comprises a powertrain 12 in which a crankshaft of an internal combustion engine 14 is coupled via a rotor of a rotary DC electrical machine (i.e. motor/generator) 16 to an input of a transmission 18. An output of transmission 18 is coupled via a driveshaft 20 to a differential 22 of a rear axle 24 having wheels 26 attached to outer ends of respective shafts. Principles of the invention can be applied to various vehicle drivetrain configurations other than a rear wheel drive configuration.

An engine control module 28 is associated with engine 14 for controlling various aspects of engine operation based on various inputs to module 28. The inputs are not specifically shown.

PHEV 10 also comprises a low-voltage electrical system based on 12 and/or 24 VDC power. PHEV 10 further comprises a high-voltage electrical system based on DC voltage in a range from 300 VDC to 600 VDC.

The low-voltage system comprises a DC battery pack 30 that comprises one or more D.C. storage batteries. The high-voltage system comprises a DC battery pack 32 that comprises one or more batteries.

Collectively, the high- and low-voltage systems supply the electric power needs of various electrical accessories and devices in the vehicle.

The high-voltage system further comprises a high-voltage control module 34 whose primary purpose is to interface battery pack 32 and motor/generator 16 so as to provide for the battery pack to operate motor/generator 16 at times when it is appropriate for stored electrical energy to be used either in whole or in part to propel PHEV 10 via powertrain 12. Module 34 also has respective channels of communication 36, 38 with engine control module 28 and battery pack 30 respectively.

Figure 4:
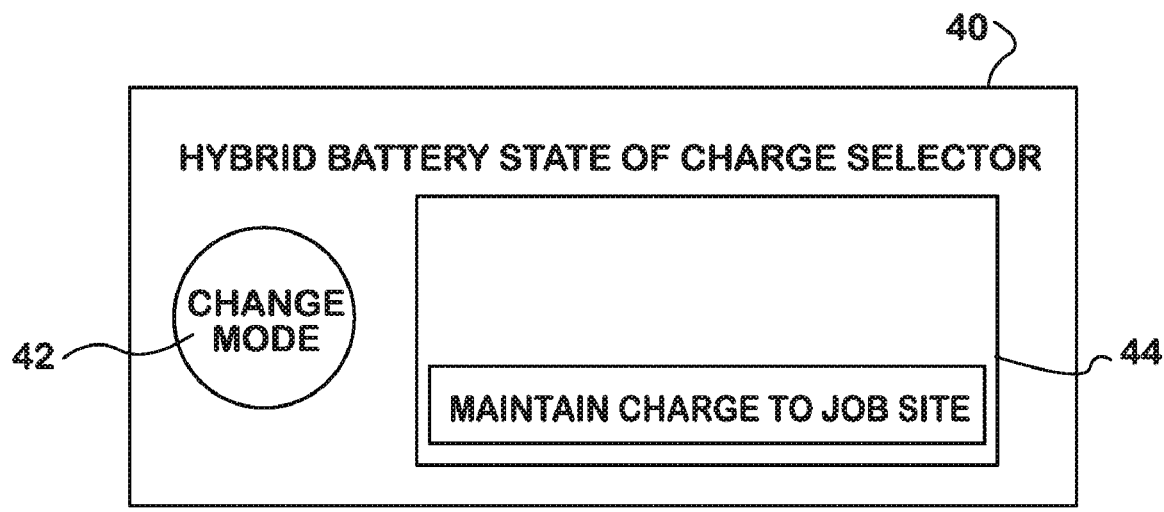
FIG. 4 shows the module of FIG. 2, but with the display presenting different information than in FIG. 2.
Figure 5:
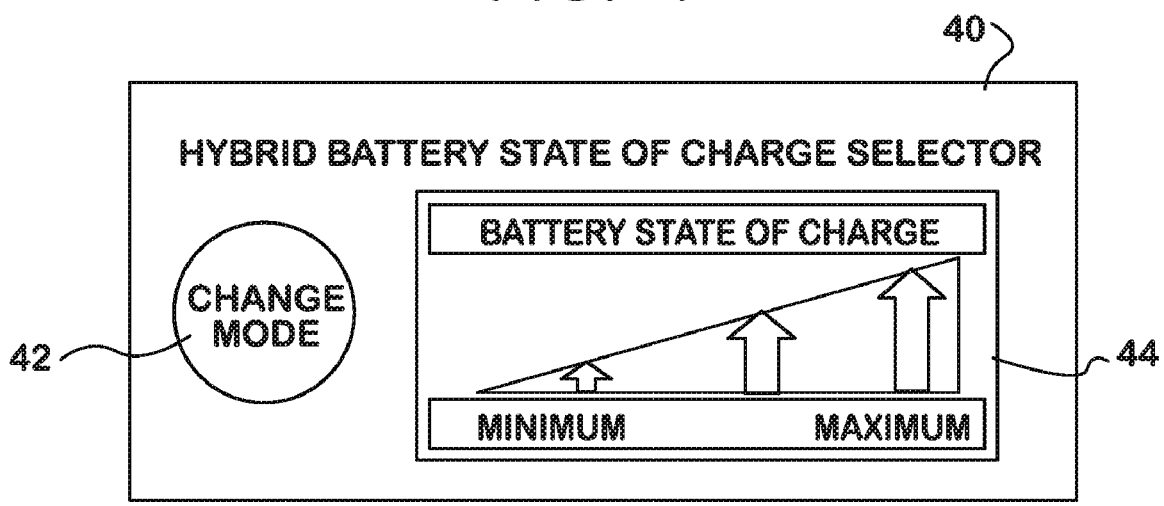
FIG. 5 shows the module of FIG. 2, but with the display presenting different information than in either FIG. 2 or FIG. 4.

On an instrument panel inside an occupant compartment of PHEV 10 is a module 40, shown in more detail by itself in FIGS. 4 and 5, that comprises a push-button operated switch 42 and an electronic display 44.

FIG. 1 shows a plug 46 that can be plugged into a receptacle (not shown) on an electric power grid that provides AC voltage, such as from a commercial electric utility company. When plug 46 is connected to the grid, alternating current drawn from the grid can be converted by conventional AC to DC conversion in module 34 into direct current for re-charging battery pack 32.

PHEV 10 also has a high-voltage power inverter 48 that can convert electric energy stored in battery pack 32 into one or more AC voltages, such as the representative ones shown in FIG. 1. Such voltages can be used to operate various electric power tools and devices at a job site. Inverter 48 interfaces with battery pack 32 through module 34 which provides the proper control and functionality for enabling inverter 48 to be operated by current from the battery pack when such tools and devices are used. Not shown in FIG. 1 is a DC to DC converter, that can be additional to or in place of inverter 48, for converting the high-voltage DC of battery pack 32 into a lower DC voltage or voltages for use by other electric tools and devices that operate on DC rather than AC electric power. Such a converter would also interface with the battery pack through module 34.

Figure 2:
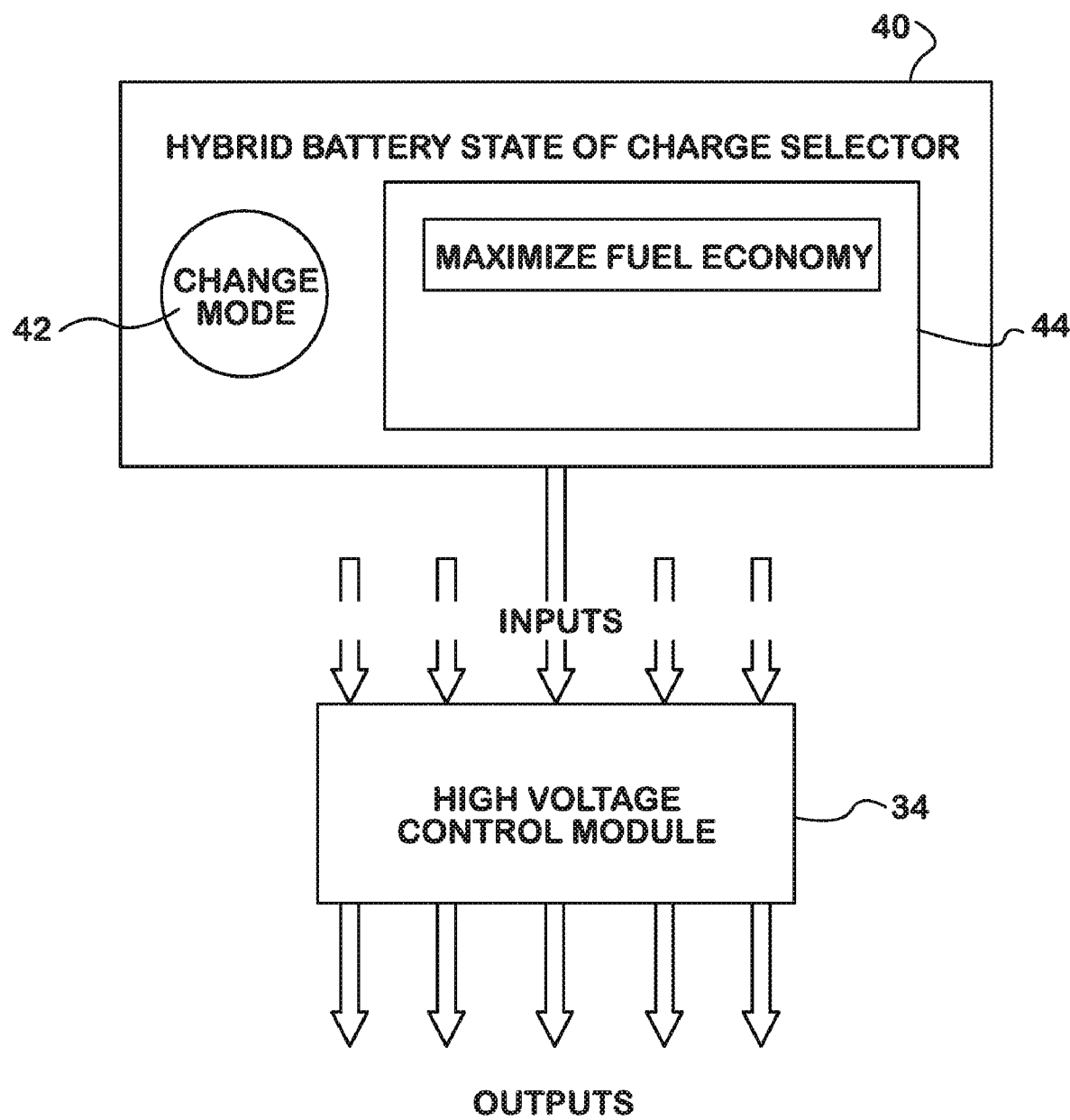
FIG. 2 shows more detail, including a module containing a display, related to a portion of FIG. 1.

When the ignition switch is turned from "off" to "on", the high-voltage battery pack management strategy is automatically placed in one of the two strategies, namely the "Maximize Fuel Economy" strategy or the "Maintain Charge To Job Site" strategy. The vehicle is considered to be operating in the "Maintain Charge To Job Site" mode when the algorithm or driver has selected the "Maintain Charge To Job Site" strategy, and in the "Maximize Fuel Economy" mode when the algorithm or driver has selected the "Maximize Fuel Economy" strategy. The particular strategy that is being used appears on display 44. In FIG. 2 the strategy that is in place is shown on display 44 as "Maximize Fuel Economy".

Switch 42 provides for the operator of PHEV 10 to change the strategy by pressing its push-button actuator. FIG. 4 shows the strategy having been changed to the "Maintain Charge To Job Site" strategy.

When the ignition switch is turned from "off" to "on", the particular strategy in which battery pack management is placed is a function of a calibratable parameter that was programmed into module 34 at the time of PHEV build. The calibratable parameter can assume any one of several different values, given here by way of example as "1" and "2".

If the calibratable parameter has been set to "1", then the management strategy assumes the strategy that was in place when the ignition switch was last turned off regardless of whether the battery pack has or has not received a plug-in re-charge.

If the calibratable parameter has been set to "2", then the algorithm automatically selects, i.e. defaults to, the "Maintain Charge To Job Site" strategy if this is the first time that the ignition switch has been operated from "off" to "on" after the battery pack received a plug-in re-charge. If this is not the first time that the ignition switch has been operated from "off" to "on" after a plug-in re-charge, then the algorithm selects as the default strategy the strategy that was in effect when the ignition switch was last turned off.

The "Maximize Fuel Economy" strategy preferably includes an "Adaptive Learning Feature" that serves to tailor the "Maximize Fuel Economy" in accordance with how PHEV 10 is being actually being driven. An adaptive learning algorithm in a processor of module 34 monitors various parameters, such as SOC of battery pack 32, elapsed vehicle operating time, amount of battery pack re-charging by regenerative braking battery re-charging, and distance traveled, to dynamically update the battery pack re-charging strategy.

For example if PHEV 10 is being operated in a manner mostly at lower speeds with frequent starting and stopping (accel and decel), the adaptive learning algorithm allows relatively greater battery discharge (measured by SOC) so that more regenerated electrical energy from the battery pack is used for acceleration so as to thereby maximize fuel efficiency. On the other hand, if the PHEV is operating mostly at highway cruising speed with only occasional decelerations, the algorithm causes the battery pack SOC to be maintained at an established relatively higher SOC that allows the battery pack to recover energy during occasional decelerations but to supply electrical energy for propulsion when battery SOC reaches the established relatively higher limit.

Figure 3:
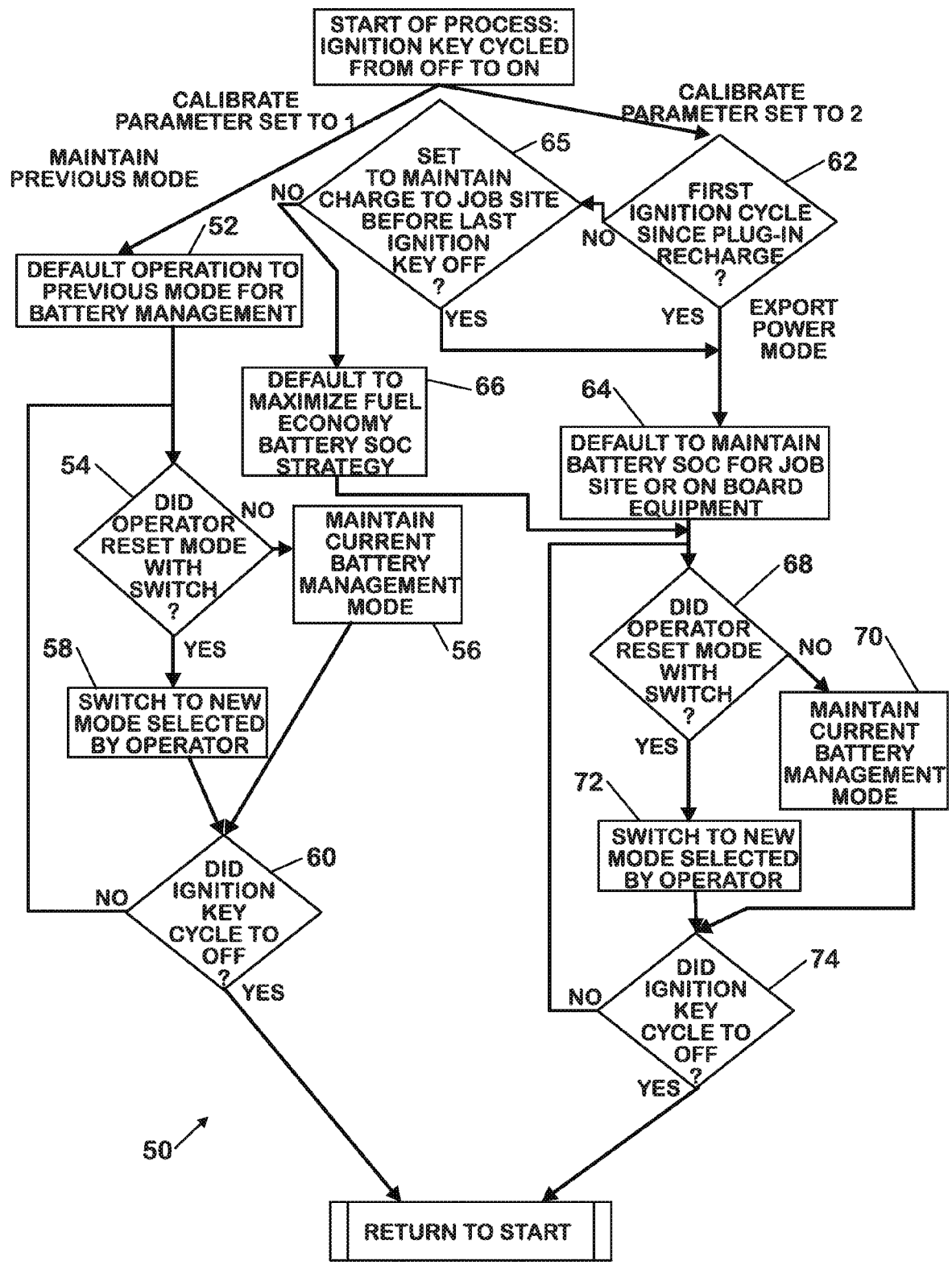
FIG. 3 shows an algorithm for setting battery pack management strategy.

FIG. 3 shows an algorithm 50 that uses the calibratable parameter feature. The algorithm executes when the ignition switch is operated from "off" to "on".

If the calibratable parameter was set to "1", the battery pack management strategy defaults to whatever the previous strategy was when the ignition switch was turned off, as shown by a step 52. The default strategy is made known to the vehicle operator on display 44. The operator has the opportunity to change the strategy at any time by operating switch 42 to select the other strategy. A step 54 monitors for such a change.

If no change is selected, a step 56 maintains the current strategy. If a change is selected, a step 58 causes the newly selected strategy to manage the battery pack.

After the occurrence of either step 56 or 58, a step 60 checks the status of the ignition switch. As long as the ignition switch remains on, the algorithm continues to loop back to step 54. Switching back and forth from one strategy to the other is possible as long as the ignition switch remains on.

When step 60 detects that the ignition switch has been turned off, the strategy that is being used at that time becomes the default when the ignition switch is next turned on. Execution of the algorithm is discontinued while the ignition switch is off.

If the calibratable parameter was set to "2", the algorithm performs a step 62 upon the ignition switch being turned on. The purpose of step 62 is to determine if this is the first time that the ignition switch has been turned on after battery pack 32 has been re-charged from the utility grid (i.e., after plug-in re-charge). If it is the first time, then the battery pack management strategy defaults to the "Maintain Charge To Job Site" strategy that is shown at step 64 and alternately named in the Figure as "Maintain Battery SOC for Job Site or On Board Equipment".

The driver is allowed to change the strategy in the same way as when the calibratable parameter was set to "1", by a series of steps 68, 70, 72, 74, corresponding to steps 54, 56, 58, 60.

However, if step 62 determines that this is not the first time that the ignition switch has been turned on since the last plug-in re-charge, then a step 65 is performed to determine if the strategy that was in effect when the ignition switch was last turned off was the "Maintain Charge To Job Site" strategy.

If it was, then that same strategy continues, while steps 68, 70, 72, and 74 allow the driver to change it at any time.

If it wasn't, then a step 66 causes the battery management strategy to default to the "Maximize Fuel Economy" strategy, with steps 68, 70, 72, and 74 still allowing the driver to change to the "Maintain Charge To Job Site" strategy at any time. In this way, the strategy defaults to the one that was in effect when the ignition switch was last turned off, unless there was an intervening plug-in re-charge in which case the strategy defaults to the "Maintain Charge To Job Site" strategy.

Once the strategy has been set by either step 64 or step 66, it always remains possible for the operator to change it in the same way as when the calibratable parameter was set to "1".

If the particular strategy on display 44 isn't changed by the driver within a certain amount of time, the display defaults to a screen that presents battery pack SOC information, such as in the graphical manner shown in FIG. 5 where the level is indicated by a highlighted amount between Minimum and Maximum. If the driver press the actuator of switch 42, the display returns to the screen that shows the current strategy. Pressing the switch actuator while this screen is being displayed will change the strategy while the strategy will remain unchanged if the actuator isn't pressed. Failure to press the actutor within a certain amount of time will result in the screen returning to the one shown in FIG. 5.

While a presently preferred embodiment of the invention has been illustrated and described, it should be appreciated that principles of the invention apply to all embodiments falling within the scope of the following claims.

What is claimed is:

1. A hybrid electric vehicle comprising:
 a chassis comprising wheels on which the vehicle travels;
 a powertrain coupled to driven ones of the wheels;
 an ignition switch that when operated to an "on" position enables the powertrain to propel the vehicle and when operated to an "off" position shuts down the powertrain;
 the powertrain comprising an internal combustion engine having a rotary output coupled to a rotary input of an electric motor/generator that has a rotary output coupled to the driven wheels;
 a battery pack coupled to the motor/generator through a controller for selectively operating the motor/generator as a motor that draws electricity from the battery pack to add torque to the powertrain and as a generator that delivers electricity to the battery pack to subtract torque from the powertrain when a management strategy for the battery pack allows such operation;
 the controller being selectively operable to any of multiple strategies for managing the battery pack via an algorithm that, when the ignition switch is operated from "off" position to "on" position, operates to select a particular battery pack management strategy according to a calibratable parameter that, for the vehicle, has been set to a particular one of multiple values;
 a first of the calibratable parameter values being effective to cause the algorithm to set the battery pack management strategy to the same battery pack management strategy that was being used when the ignition switch was last operated from "on" position to "off" position, and a second of the calibratable parameter values being effective to cause the algorithm to set the battery pack management strategy to a strategy that is determined by the number of times that the ignition switch has been operated from "off" position to "on" position since the last re-charging of the battery pack from a source external to the vehicle.

2. A hybrid electric vehicle as set forth in claim 1 wherein one strategy regulates battery pack SOC at a relatively larger SOC value and another strategy regulates battery pack SOC at a relatively smaller SOC value, and when the calibratable parameter has been set to the second value and an operation of the ignition switch from "off" position to "on" position is the first to occur since the last re-charging of the battery pack from a source external to the vehicle, the algorithm sets the strategy to the one strategy.

3. A hybrid electric vehicle as set forth in claim 1 further including a selection input to the controller for allowing a person, instead of the algorithm, to select a battery pack management strategy for use by the controller.

4. A hybrid electric vehicle as set forth in claim 3 wherein the selection input comprises a switch disposed along side a display that presents a screen on which a battery pack management strategy is visible.

5. A hybrid electric vehicle as set forth in claim 4 wherein the display is also operable to present a screen showing battery pack SOC.

6. A hybrid electric vehicle as set forth in claim 1 wherein the vehicle has a connector for mating connection with an outlet from an electric power grid to enable the battery pack to be re-charged from the grid.

7. A method of operating a hybrid electric vehicle that has a chassis comprising wheels on which the vehicle travels; a powertrain coupled to driven ones of the wheels; the powertrain comprising an internal combustion engine having a rotary output coupled to a rotary input of an electric motor/generator that has a rotary output coupled to the driven wheels; an ignition switch that when operated to an "on" position enables the powertrain to propel the vehicle and when operated to an "off" position shuts down the powertrain; a battery pack coupled to the motor/generator through a controller for selectively operating the motor/generator as a motor that draws electricity from the battery pack to add torque to the powertrain and as a generator that delivers electricity to the battery pack to subtract torque from the powertrain when a management strategy for the battery pack allows such operation; the method comprising:
 when the ignition switch is operated from "off" position to "on" position, executing an algorithm to select a strategy for managing the battery pack according to a calibratable parameter that, for the vehicle, has been set to a particular one of multiple values, wherein a first of the calibratable parameter values is effective to cause the algorithm to set the battery pack management strategy to the same battery pack management strategy that was being used when the ignition switch was last operated from "on" position to "off" position, and a second of the calibratable parameter values is effective to cause the algorithm to set the battery pack management strategy to a strategy that is determined by the number of times that the ignition switch has been operated from "off" position to "on" position since the last re-charging of the battery pack from a source external to the vehicle.

8. A method as set forth in claim 7 wherein one strategy regulates battery pack SOC at a relatively larger SOC value and another strategy regulates battery pack SOC at a relatively smaller SOC value, and when the calibratable parameter has been set to the second value and an operation of the ignition switch from "off" position to "on" position is the first to occur since the last re-charging of the battery pack from a source external to the vehicle, the algorithm sets the strategy to the one strategy.

9. A method as set forth in claim 7 further including operating a selection input to the controller to select a battery pack management strategy for use by the controller that if different from the current strategy being used, supplants the latter strategy.

10. A method as set forth in claim 9 wherein the step of operating the selection input comprises operating a switch disposed along side a display that presents a screen on which a battery pack management strategy is visible.

11. A method as set forth in claim 10 further comprising operating the display to present a screen showing battery pack SOC.

* * * * *